United States Patent [19]

Tanaka et al.

[11] 4,337,676

[45] Jul. 6, 1982

[54] MANUAL OPERATION DEVICE

[75] Inventors: Shinsaku Tanaka, Tokyo; Takashi Watanabe, Kawasaki, both of Japan

[73] Assignee: Tanashin Denki Co., Ltd., Tokyo, Japan

[21] Appl. No.: 119,372

[22] Filed: Feb. 7, 1980

[30] Foreign Application Priority Data

Jul. 23, 1979 [JP] Japan .................................. 54-93413
Jul. 23, 1979 [JP] Japan .................................. 54-11576

[51] Int. Cl.$^3$ ........................ G05G 1/02; G05G 5/00; G05G 17/00
[52] U.S. Cl. ................................ 74/483 PB; 74/3.5; 74/435
[58] Field of Search ...................... 74/3.5, 435, 483 PB

[56] References Cited

U.S. PATENT DOCUMENTS 4,026,496  5/1977  Kaneda .......................... 74/483 PB
4,178,809  12/1979  Hanzawa ........................ 74/483 PB Primary Examiner—Allan D. Herrmann
Attorney, Agent, or Firm—Schwartz, Jeffery, Schwaab, Mack, Blumenthal & Koch

[57] ABSTRACT

When with the manual operation device of this invention, a selected one of many push buttons provided for a cassette tape recorder is depressed, then an insertable actuating member lying below that depressed push button is brought down between a common transmission member and an operation member corresponding to the insertable actuating member, causing the transmission member to be previously rotated slightly in a direction opposite to that in which said transmission member is subsequently rotated for actuation. The slight previous rotation of the transmission member in said opposite direction disengages an engagement member from a large gear. As a result, the large gear is slightly rotated by the elastic force of one of the fixed contacts of a leaf switch to be engaged with a pinion. As a result, the leaf switch is actuated to drive a motor, which in turn rotates the pinion to drive the large gear. The common transmission member is rotated with the large gear to move the operation member to a prescribed position by means of the insertable actuating member, thereby causing a cassette tape recorder to be operated for a selected mode of play, record, fast forward, rewind or stop.

5 Claims, 16 Drawing Figures

MANUAL OPERATION DEVICE

BACKGROUND OF THE INVENTION

This invention relates to a manual operation device designed to reduce by mechanical means a force of operating, for example, a cassette tape recorder.

With a prior art push button type manual operation device used with, for example, a cassette tape recorder, one of the push buttons is depressed. A force depressing the push button is transmitted to one of the operation members corresponding to the respective push buttons. The operation member is actuated to carry out any of the various operation modes such as play, record, fast forward, rewind and stop. However, mechanisms for carrying out the various functions of a cassette tape recorder act as a load on the operation members. With the conventional cassette tape recorder, for example, the depression of a push button requires a great force, failing to facilitate the operation of the cassette tape recorder.

Therefore, a cassette tape recorder provided with an electromagnetic plunger is technically contemplated in an attempt to reduce a force of depressing the push button. With this type of tape recorder, the electromagnetic plunger is actuated by the operation of a switch to transmit the moment of the moving plunger to the selected operation member. However, this plunger type tape recorder has the drawback that it is necessary to use a large capacity plunger and expensive transformer.

SUMMARY OF THE INVENTION

It is accordingly an object of this invention to provide an inexpensive manual operation device which can be easily operated by mechanical means.

Another object of the invention is to provide a manual operation device which is not only easily operated by mechanical means but also saved from the difficulties which might result from the erroneous operation of a cassette tape recorder.

To this end, the present invention provides a manual operation device which comprises:

a drive rotatable member acting as a source of driving power;

a driven rotatable member detachably fitted to the drive rotatable member and normally urged for engagement therewith;

an engagement member for locking the driven rotatable member in a state disengaged from the drive rotatable member;

a transmission member movable back and forth with the driven rotating member; and a plurality of self-returning insertable actuating member provided for the respective operation members and each manually set between the transmission member and a selected operation member to release the engagement member from the driven rotating member and also transmit the actuation of the transmission member to the selected operation member.

BRIEF DESCRIPTION OF THE DRAWINGS

FIG. 1 is a side view, partly in section, of the arrangement of the proximity of the operation member;

FIG. 2 is an enlarged side view of the II section of FIG. 1;

FIG. 3 is a bottom view, partly in section, of the arrangement of the proximity of the drive section;

FIGS. 4 and 5 are the bottom views of the arrangement of the proximity of the drive section while being actuated;

FIGS. 6 and 7 are the side views, partly in section, of the arrangement of the proximity of the operation member while being actuated;

FIG. 8 is a side view, partly in section, of the arrangement of the proximity of the operation member;

FIG. 9 is a bottom view, partly in section, of the arrangement of the proximity of the drive section;

FIG. 10 shows the arrangement of a motor-driving circuit;

FIG. 11 is a side view, partly in section, of the arrangement of the proximity of the operation member while being actuated;

FIGS. 12 to 14 are the bottom views, partly in section, of the arrangement of the proximity of the drive member while being actuated; and FIGS. 15 and 16 are the side views, partly in section, of the arrangement of the proximity of the operation member, while being actuated.

DETAILED DESCRIPTION OF THE PREFERRED EMBODIMENTS

Figure 1:
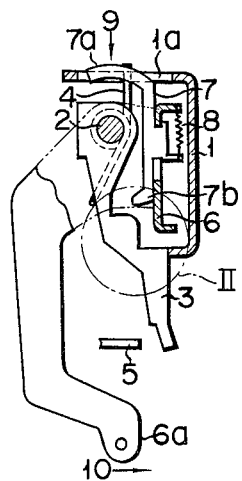
FIGS. 1 to 7 indicate a manual operation device according to one embodiment of this invention.

FIGS. 1 to 7 show a manual operation device according to one embodiment of this invention applied to a cassette tape recorder. Referring to FIG. 1, reference numeral 1 denotes a fitting member fixed to a substrate of a cassette tape recorder (not shown). 2 shows a fitting shaft, both ends of which are supported by the fitting member 1. A plurality of operation members 3 (only one indicated) are swingably mounted on the fitting shaft 2. Each operation member 3 is normally urged counter-clockwise of FIG. 1 by a spring 4 stretched between said operation member 3 and fitting member 1, and is engaged with the lower end of the fitting member 1 as indicated in FIG. 1. When moved clockwise against the force of the spring 4, the operation member 3 actuates a prescribed mechanism mounted on the substrate of a cassette tape recorder for a required operation mode such as play, record, fast forward, rewind or stop. An engagement board 5 is provided near the swingable end of the operation member 3. The engagement board 5 is engaged with the operation member 3 for the mode of play, record, fast forward or rewind. When the operation member 3 for the stop mode is actuated, then said engagement board 5 is released. Since this arrangement is already known, no detailed description thereof is given.

Figure 2:
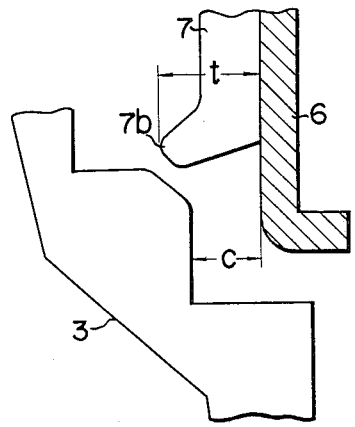
Figure 3:
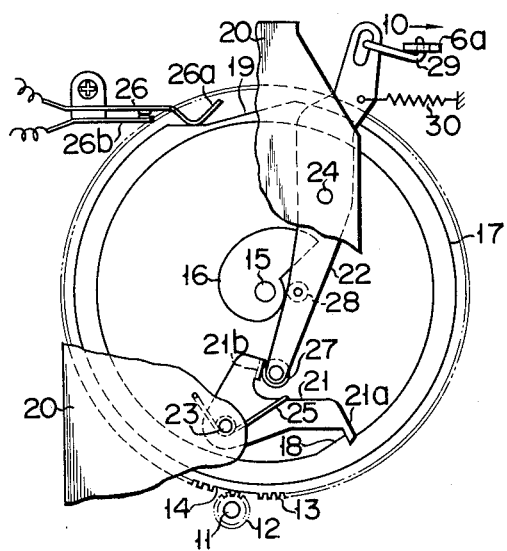

A single common transmission member 6 is rotatably mounted on the fitting shaft 2. A plurality of insertable actuating members 7 (only one indicated) corresponding to the respective operation members 3 are attached to the common transmission member 6 to slide vertically of FIG. 1. The insertable actuating member 7 is normally urged upward by a very weak spring 8 stretched between said insertable actuating member 7 and transmission member 6. This insertable actuating member 7 is a self-returning type which falls when depressed in the direction of an arrow 9 indicated in FIG. 1, but, when released from the depressing force, is lifted back to the original position. The upper segmental surface 7a of the insertable actuating member 7 projects upward from an opening 1a formed in the fitting member 1. An insertable portion 7b formed at the lower end of the insertable actuating member 7 is brought between the transmission member 6 and operation member 3 when the insertable actuating member 7 falls. As shown in FIG. 2, a space c defined between the transmission member 6 and operation member 3 into which the insertable portion 7b is to be introduced is made narrower than the thickness t of the insertable portion 7b. When the insertable portion 7b is brought down into the space, then the transmission member 6 is rotated about the fitting shaft 2 while holding the insertable actuating member 7. At this time, the operation member 3 which receives a heavy load from the spring 4 is not rotated. The transmission member 6 has a coupling arm 6a formed at one end. When the insertable portion 7b of the insertable actuating member 7 is taken into a space between the transmission member 6 and operation member 3, then the coupling arm 6a is rotated in the direction of an arrow 10 indicated in FIG. 1. FIG. 3 shows the coupling arm 6a as viewed from the lower side of FIG. 1.

Reference numeral 11 of FIG. 3 denotes a capstan shaft rotatably fitted to the substrate of a cassette tape recorder. A pinion 12 acting as a drive rotatable member is mounted on the capstan shaft 11. Reference numeral 13 of FIG. 3 is a large gear acting as a driven rotatable member. This large gear 13 has a notch 14 formed by eliminating some teeth, and is rotatably supported on a shaft 15 fixed to the substrate of the cassette tape recorder. The central portion of the underside of the large gear 13 is fitted with a vortical cam 16. An annular protuberance 17 is formed on the periphery of the underside of said large gear 13. An engagement projection 18 is formed on the inner peripheral wall of the annular protuberance 17. A shallow V-shaped cavity 19 is provided on the outer peripheral wall of said protuberance 17. A fitting board 20 is disposed parallel with the substrate of the cassette tape recorder. The large gear 13 is set between the fitting board 20 and the substrate of the cassette tape recorder. An engagement member 21 is rotatably mounted on the fitting board 20 by a shaft 23. A cam lever 22 is rotatably set on said fitting board 20 by a shaft 24. The engagement member 21 is formed substantially in the V-shape. The angular portion of said V-shape is rotatably supported on the shaft 23. One section of said engagement member 21 is formed into an engagement pawl 21a, and the other section into a bent push section 21b. The engagement member 21 is normally urged clockwise of FIG. 3 by a spring 25 wound about the shaft 23 with the engagement pawl 21a pressed against the inner peripheral wall of the annular protuberance 17 of the large gear 13. Fitted to the substrate of the cassette tape recorder is a leaf switch 26 which is connected through a self-holding circuit to a drive circuit of a motor for actuating the capstan shaft 11 and reel shafts (not shown). One contact 26a of the leaf switch 26 is elastically pressed against the outer peripheral wall of the annular protuberance 17 of the large gear 13. When brought down to the deepest part of the V-shaped cavity 19 of the annular protuberance 17 said one contact 26a touches the other contact 26b (FIG. 4) by its own elastic force. As a result, a self-holding relay is rendered conducting to energize a motor circuit. When removed from the deepest part of the V-shaped cavity 19, then said one contact 26a leaves the other contact 26b. Where, as shown in FIG. 3, the engagement pawl 21a of the engagement member 21 is engaged with the engagement projection 18 of the annular protuberance 17, thereby preventing the large gear 13 from being rotated counterclockwise, then said one contact 26a of the leaf switch 26 elastically abuts against the inclined plane of the V-shaped cavity 19 which is first touched by said one contact 26a when the large gear 13 is rotated counterclockwise of FIG. 3, thereby urging the large gear 13 in the counterclockwise direction. At this time, the notch 14 of the large gear 13 is made to face the pinion 12, thereby disengaging the large gear 13 from the pinion 12.

The intermediate part of the cam lever 22 is rotatably supported on the shaft 24. A push roller 27 for driving the push section 21b of the engagement member 21 from the inside is rotatably fitted to one end of the cam lever 22. A cam roller 28 capable of touching the vortical cam 16 is rotatably set between the push roller 27 and shaft 24. The other end of the cam lever 22 is connected to the coupling arm 6a of the transmission member 6 by means of a hook 29. The cam lever 22 is normally urged clockwise of FIG. 3 by a spring 30 stretched between said cam lever 22 and a proper fitting section (for example, the substrate of the cassette tape recorder), thereby causing the push roller 27 to abut against the inner wall of the push section 21b of the engagement member 21. The engagement member 21 and cam lever 22 are so urged by the springs 25, 30 as to be pushed against each other. Since, however, the spring 25 has a greater urging force than the spring 30, the engagement pawl 21a of the engagement member 21 is normally elastically pressed against the inner peripheral wall of the annular protuberance 17 of the large gear 13.

Figure 4:
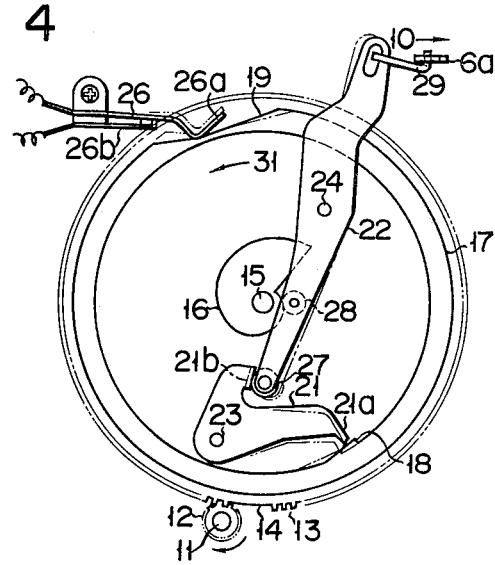
Figure 5:
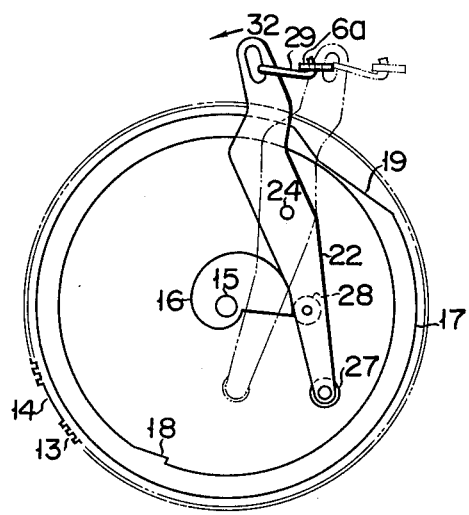
Figure 6:
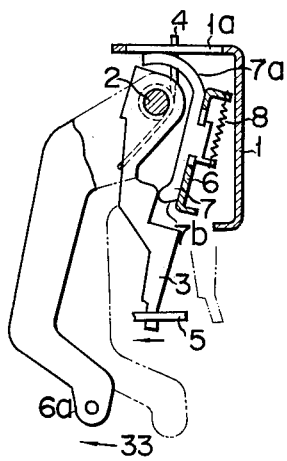

There will now be described the operation of a manual operation device according to the above-mentioned embodiment of this invention. FIGS. 1 to 3 indicate the condition of the manual operation device before it is actuated. Under this condition, a cassette tape recorder stands at rest. Where one or two of the push buttons for the operation modes of play, record, fast forward and rewind are selectively depressed, then the upper segmental surface 7b of the insertable actuating member 7 disposed below said depressed push button is brought downward in the direction of the arrow 9 indicated in FIG. 1. As a result, the insertable section 7b of said actuating member 7 is moved between the transmission member 6 and operation member 3. At this time, the transmission member 6 is rotated counterclockwise, while holding the insertable actuating member 7. The coupling arm 6a of the transmission member 6 is slightly shifted in the direction of the arrow 10 shown in FIGS. 1 and 3. A moment derived from the shifting of the coupling arm 6a is transmitted to the cam lever 22 by means of the hook 29 of FIG. 4. As a result, the engagement member 21 is pushed by the push roller 27 of the cam lever 22 against the urging force of the spring 25, thereby releasing the engagement pawl 21a of the engagement member 21 from the engagement projection 18. Accordingly, the large gear 13 is slightly rotated counterclockwise in the direction of an arrow 31 (FIG. 4). The notch 14 of the large gear 13 is moved similarly counterclockwise, thereby effecting engagement between the large gear 13 and pinion 12. At this time, the contact 26a of the leaf switch 26 is brought down to the deepest part of the V-shaped cavity 19 to close the leaf switch 26. As a result, the self-holding relay is rendered conducting to energize a motor circuit, causing the capstan shaft 11 and a reel shaft (not shown) to be rotated. When the capstan shaft 11 is rotated by engagement between the large gear 13 and pinion 12, then the large gear 13 is rotated counterclockwise in the direction of the arrow 31 (FIG. 4). The vortical cam 16 mounted on the large gear 13 pushes the cam roller 28, causing the cam lever 22 to be moved in the direction of an arrow 32 (FIG. 5) against the urging force of the spring 30 to occupy a position indicated in FIG. 5. A moment derived from the counterclockwise rotation of the cam lever 22 is transmitted to the coupling arm 6a by means of the hook 29, causing the transmission member 6 to be clockwise rotated in the direction of an arrow 33 indicated in FIG. 6. At this time, the insertable actuating member 7 is clamped between the transmission member 6 and operation member 3 and is prevented from being lifted back to the original position by a frictional force occurring between said transmission member 6 and operation member 3. Therefore, the rotation moment of the transmission member 6 is transmitted to the operation member 3 through the insertable actuating member 7. As a result, the transmission member 6, insertable actuating member 7 and operation member 3 are jointly rotated in the same direction indicated by an arrow 33 (FIG. 6). The operation member 3 is locked in an actuated state by the engagement board 5. When the operation member 3 is rotated clockwise, a prescribed mechanism mounted on the substrate of the cassette tape recorder is actuated to cause the tape recorder to commence the operation mode of play, record, fast forward or rewind, as need arises. At this time, all the insertable actuating members 7 provided for the respective operation members 3 are jointly rotated. However, unless the insertable actuating member 7 is forced down, the rotation moment of said insertable actuating member 7 is not transmitted to the corresponding operation member 3.

The engagement member 21 is rotated while being pushed by the push roller 27 of the cam lever 22 and removed from the inner peripheral wall of the annular protuberance 17. When, however, the large gear 13 is rotated counterclockwise in the direction of the arrow 31 (FIG. 4), and the vortical cam 16 depresses the cam pin 28, then the engagement member 21 is released from the push roller 27 and regains its original position by the urging force of the spring 25 to be again pressed against the inner peripheral wall of the annular protuberance 17. Where the large gear 13 makes a one full rotation and the notch 14 is made to face the pinion 12, then the engagement pawl 21a is engaged with the engagement projection 18, causing the large gear 13 again to take a position disengaged from the pinion 12. At this time, the contact 26a of the leaf switch 26 is elastically pressed against the inclined plane of the V-shaped cavity 19. Whenever, therefore, disengaged from the engagement member 21, the large gear 13 can be rotated, until it is engaged with the pinion 12.

Figure 7:
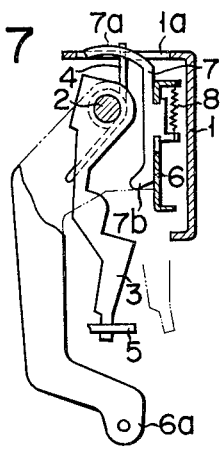

When the large gear 13 makes one full rotation, then the cam roller 28 falls from the largest radius section of the vortical cam 16 to the smallest radius section thereof. As a result, the cam roller 22 regains its original position shown in FIG. 3. At this time, the transmission member 6 regains its original position jointly with the cam lever 22. The insertable actuating member 7 is released from a state clamped between the transmission member 6 and operation member 3, and is lifted back to its original position (FIG. 7) by the action of the spring 8. FIG. 7 shows a selected operation member 3 locked in an actuated state by the engagement board 5 for an operation mode of play, record, fast forward or rewind. To release the tape recorder from such operation mode, the stop push button has only to be depressed. Where the stop push button is depressed under the condition of FIG. 7, the insertable actuating member 7 corresponding to the stop push button falls to cause the operation member 3 corresponding to the stop push button to be actuated. As a result, another operation member 3 corresponding to any of the operation modes such as play, record, fast forward and rewind is released from a state locked by the engagement board 5 for actuation. Thereafter, the operation member 3 for the stop mode is released from the engagement board 5 to regain its original position.

A particular operation mode, for example, the play mode, can be changed over to another operation mode, for example, the rewind mode simply by depressing the rewind push button. In other words, when a different insertable actuating member 7 from that which corresponds to the top mode is actuated during the condition of FIG. 7, then an operation member 3 corresponding to the subsequently depressed push button, for example, for the rewind mode, is locked in an actuated state by the engagement board 5 in place of the operation member 3 corresponding to the preceding play mode, thereby changing the operation of a cassette tape recorder to the desired rewind mode.

When, during the condition of FIG. 7 in which the cassette tape recorder is operated for c-selected mode, a push button for the same operation mode is depressed by mistake, then the insertable actuating member 7 corresponding to said selected operation mode is brought down all the same. In this case, however, the operation member 3 corresponding to said selected operation mode is already locked in an actuated state by the engagement board 5. As a result, a clearance between the transmission member 6 and said operation member 3 is greater than the thickness t of the insertable portion 7b of the insertable actuating member 7. Therefore, the descent of the insertable actuating member 7 does not give rise to the actuation of the transmission membr 6, nor is, the engagement member 21 displaced from the engagement projection 18 of the large gear 13. In other words, the erroneous operation of any push button does not bring about the movement of any unnecessary mechanical member.

The operation modes such as record, temporary fast forward (referred to as "one") and temporary rewind (referred to as "review") are generally carried out by depressing two push buttons. With this type of manual operation device, the depression of two push buttons causes the two corresponding operation members to be locked in an actuated state by the engagement board 5 to effect the desired mechanical movement.

With the manual operation device of this invention constructed as described above, a force for actuating the operation member 3 is supplied from the pinion 12 or capstan shaft 11 acting as a drive rotatable member. Therefore, the present manual operation device in which a desired operation mode is effected simply by introducing an insertable actuating member 7 into a space defined between the operation member 3 and transmission member 6 needs a far smaller actuating force than the prior art manual operation device in which the operation member 3 is directly actuated by the hand. Further, the manual operation device of this invention in which the pinion 12 acting as a drive rotatable member is fixed to the capstan shaft 11 makes it unnecessary to provide an exclusive source of drive power for said manual operation device, and consequently is simplified in arrangement and reduced in cost. With the manual operation device of this invention, a selected insertable actuating member 7 is brought between the transmission member 6 and operation member 3 for connection therebetween. Therefore, only the operation member 3 corresponding to the selectively manually operated insertable actuating member 7 is connected to the transmission member 6. A single transmission member 6 is used in common to all the operation members 3. However, no erroneous mechanical movement results from said common use of the single transmission member 6. The manual operation device of this invention allows for the direct utilization of the operation members and engagement members and rotatable capstan shaft all used with the conventional cassette tape recorder, and is consequently applicable thereto with relative ease without noticeably changing the design.

Figure 8:
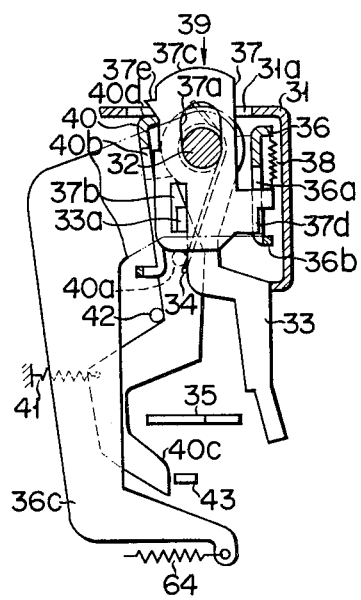
FIGS. 8 to 16 indicate a manual operation device according to another embodiment of this invention.

There will now be described by reference to FIGS. 8 to 16 a manual operation device according to another embodiment of this invention which is also applied to a cassette tape recorder. Referring to FIG. 8, reference numeral 31 denotes a downward bent fitting member securely mounted on the substrate of the cassette tape recorder. 32 is a fitting shaft 32, both ends of which are supported on the fitting member. A plurality of operation members 33 (only one indicated in FIG. 8) are swingably mounted on the fitting shaft 32. Each operation member 33 is normally urged counterclockwise of FIG. 8 by a spring 34 stretched between said operation member 33 and the fitting member 31 to be engaged with the lower end of the fitting member 31 (FIG. 8). When, however, rotated clockwise against the force of the spring 34, the operation member 33 actuates a prescribed mechanism mounted on the substrate of the cassette tape recorder for the operation mode of play, record, fast forward, rewind or stop. An engagement board 35 is provided near the rotatable end of the operation member 33. This engagement board 35 locks the operation member 33 in a state actuated for the mode of play, record, fast forward or rewind. When the operation member 33 for the stop mode is actuated, the above-mentioned operation member 33 for the play, record, fast forward or rewind is released from a locked state. This arrangement is already known, detailed description thereof being omitted.

Figure 9:
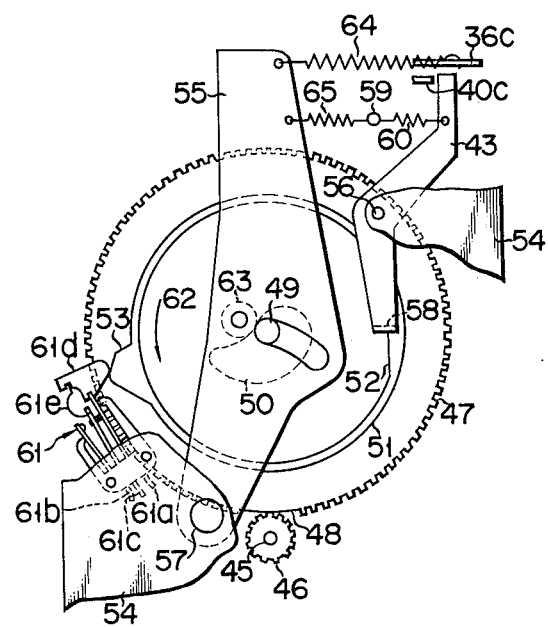

A single transmission member 36 used in common to all operation members 33 is rotatably mounted on the fitting shaft 32. A plurality of insertable actuating members 37 (only one indicated) are provided for the respective operation members 33. The fitting shaft 32 extends through an oblong hole 37a formed in the insertable actuating member 37 to be rotated therein and also vertically moved therethrough. The operation member 33 is fitted with a bent attachment 33a. The insertable actuating member 37 is provided with a rectangular guide hole 37b. The operation member 33 and insertable actuating member 37 are jointly rotated by inserting the bent attachment into the guide hole 37b. The insertable actuating member 37 is normally urged upward by a spring 38 stretched between said insertable actuating member 37 and transmission member 36. This insertable actuating member 37 is a self-returning type, which, when depressed from above in the direction of an arrow 39 indicated in FIG. 8, is brought down, and when said depression force in removed, is lifted back to its original position. The upper segmental surface 37c of the insertable actuating member 37 protrudes above an opening 31a formed in the fitting member 31. The transmission member 36 is provided with a slit 36a, through which an abutting attachment 37d projectively formed on one side of the insertable actuating member 37 is made to pass. Where the insertable actuating member 37 is brought down, the abutting attachment 37d is made to face push member 36b of the transmission member 36 which lies below the slit 36a. The transmission member 36 has a coupling arm 36c formed at one end. FIG. 9 shows said coupling arm 36c as viewed from the lower part of FIG. 8.

A release member 40 is set on the opposite side of the fitting shaft 32 to the transmission member 36. The release member 40 is rotatably mounted on the fitting member 31 by means of a support pin 40a at a point below the fitting shaft 32. The release member 40 has a slit 40b through which the insertable actuating member is made to pass and a push attachment 40c extending downward from one end of the release member 40. This release member 40 is urged clockwise of FIG. 8 by a spring 41 stretched between the push attachment 40c and a proper fitting member (for example, the substrate of the cassette tape recorder), and also engaged with a stopper 42. The release member 40 further has a bent engagement edge 40d formed at the upper end. An engagement pawl 37e is formed on the opposite side of the insertable actuating member 37 to the abutting attachment 37d. When the insertable actuating member 37 falls in the direction of the arrow 39 indicated in FIG. 8, then the engagement pawl 37e is made to side along the engagement edge 40d of the release member 40, thereby causing the release member 40 to be rotated counterclockwise of FIG. 11. When the insertable actuating member 37 is further brought downward, then the engagement pawl 37e is moved below the engagement edge 40d. As a result, the engagment edge 40d prevents the insertable actuating member 37 from being lifted back to its original position, and also enabling the release member 40 to be rotated back to its original position. The push attachment 40c of the release member 40 is indicated in FIG. 9 in the form as viewed from the lower part of FIG. 8.

An engagement member 43 is provided ahead of the rotatable end of the push attachment 40c. Where the release member 40 is rotated by the engagement pawl 37e of the insertable actuating member 37, then the push attachment 40c pushes the engagement member 43 in the direction of an arrow 44 indicated in FIGS. 11 and 12.

Referring to FIG. 9, reference numeral 45 denotes a capstan shaft rotatably fitted to the substrate of the cassette tape recorder. A pinion 46 acting as a drive rotating member is fixed to the capstan shaft 45. Reference numeral 47 denotes a large gear acting as a driven rotatable member. The large gear 47 has a notch 48 in which no teeth are formed, and is rotatably mounted on a shaft 49 fixed to the substrate of the cassette tape recorder. A vortical cam 50 projects from the center of the underside of the large gear 47 shown in FIG. 9.

An annular protuberance 51 is also projectively formed along the peripheral portion of said underside. An engagement projection 52 is formed on the inner peripheral wall of the annular protuberance 51. A substantially V-shaped start projection 53 is provided on the outer peripheral wall of the annular protuberance 51. Reference numeral 54 of FIG. 9 is a fitting board. This fitting board 54 is set parallel with the substrate of the cassette tape recorder. The driven large gear 47 is placed between the fitting board 54 and the substrate of the tape recorder. The intermediate part of the engagement member 43 is rotatably mounted on the fitting board 54 by means of a shaft 56. One end portion of a cam lever 55 is also rotatably fitted to the fitting board 54 by means of a shaft 57. The engagement member 43 has a bent engagement pawl 53 formed at one end, and is normally urged counterclockwise of FIG. 9 by a spring 60 stretched between said engagement member 43 and fixed pin 59, causing the engagement pawl 58 to be elastically pressed against the inner peripheral wall of the annular protuberance 51 of the driven large gear 47. A leaf switch 61 is fitted to the substrate of the cassette tape recorder. This leaf switch 61 has a movable contact 61c which is formed of a plate spring and provided between first and second fixed contacts 61a, 61b. The outer end of the first fixed contact 61a is fitted with a push attachment 61d. This push attachment 61d and movable contact 61c are connected together by a toggle spring 61e. When the manual operation device is at rest as shown in FIG. 9, the push attachment 61d elastically abuts against the side wall of the start projection 53, thereby urging the large gear 47 counterclockwise in the direction of an arrow 62 and causing the movable contact 61c to touch the first fixed contact 61a. When, however, the large gear 47 is rotated counterclockwise in the direction of the arrow 62, then the movable contact 61c touches the second fixed contact 61b (see FIGS. 13 and 15). When, as shown in FIG. 9, the engagement pawl 58 of the engagement member 43 is engaged with the engagement projection 52 to prevent the large gear 47 from being rotated counterclockwise in the direction of the indicated arrow 62, then the push attachment 61d of the leaf switch 61 rests on the start projection 53, causing the movable contact 61c to touch the first fixed contact 61a. As a result, the large gear 47 is urged counterclockwise in the direction of the indicated arrow 62. At this time, the notch 48 is made to face the pinion 46 (FIG. 9). Consequently, the large gear 47 is disengaged from the pinion 46.

A cam roller 63 is fitted to the intermediate part of the cam lever 55. A spring 64 is stretched between the rotatable end of the cam lever 55 and the coupling arm 36c of the transmission member 36. A spring 65 is stretched between the cam lever 55 and fixed pin 59, elastically pressing the cam roller 63 against the peripheral wall of the cam 50.

Figure 10:
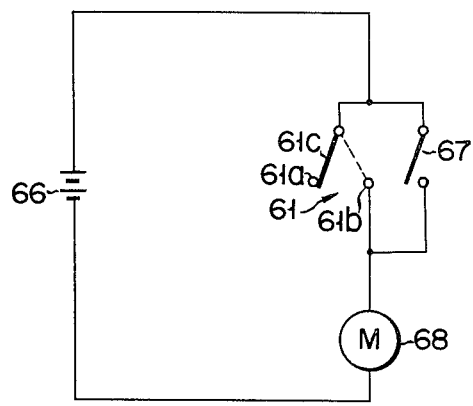

FIG. 10 shows a motor-driving circuit. A reel shaft-driving motor 68 is connected to a D.C. power source 66 through a series-connected power supply switch 67 and also through a series circuit formed of the movable contact 61c of the leaf switch 61 and the second fixed contact 61b. The power supply switch 67 remains closed when the operation member 33 is locked by the engagement board 35 in a state actuated for the operation mode of play, record, fast forward or rewind.

Figure 11:
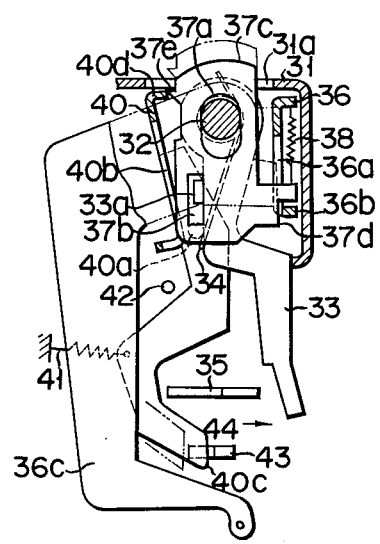
Figure 12:
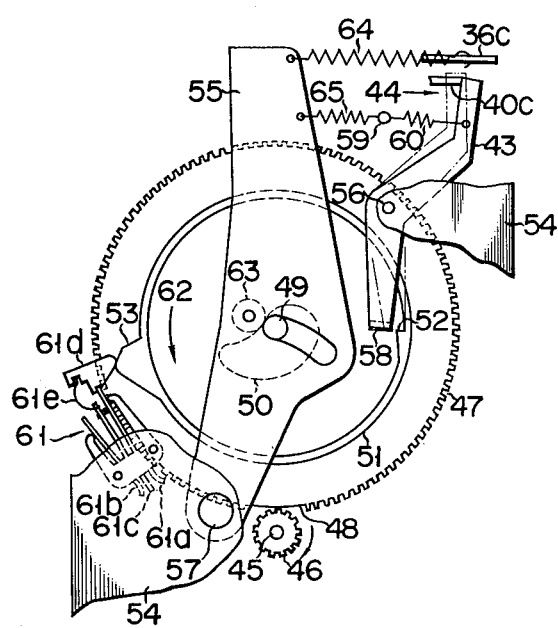
Figure 13:
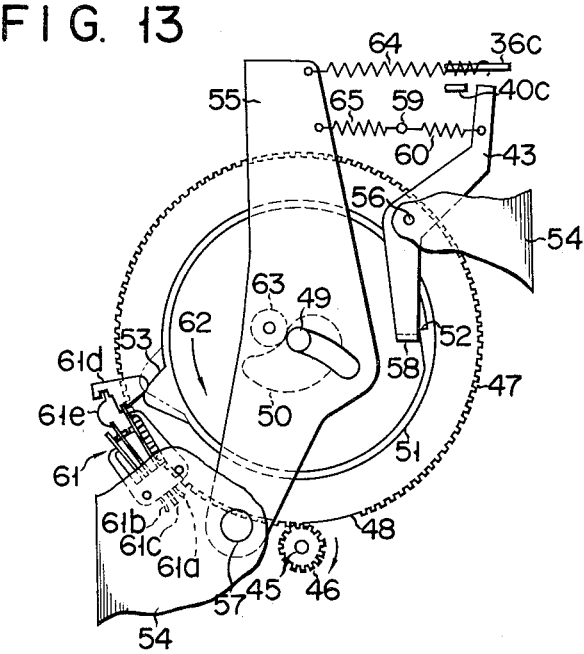
Figure 14:
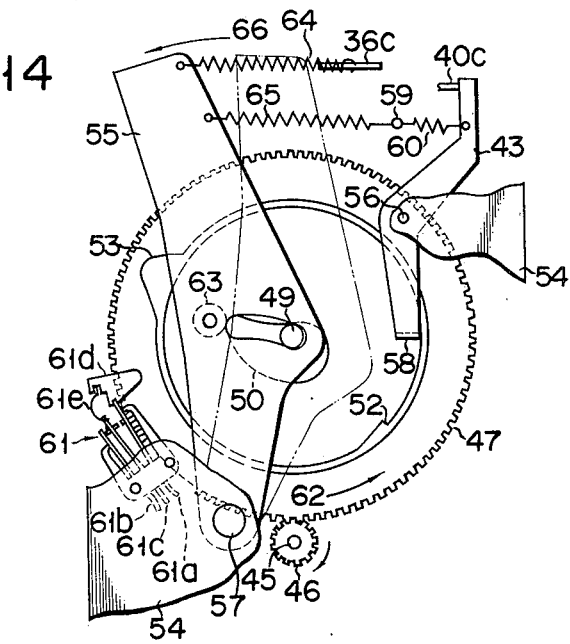

There will now be described by reference to FIGS. 8 to 16 the actuation of a manual operation device according to the second embodiment of this invention. FIGS. 8 and 9 show the condition of the manual operation device before being actuated. Under this condition, the cassette tape recorder stands at rest. When one or two of the push buttons for the operation modes of play, record, fast forward and rewind are selectively depressed, then the underlying insertable actuating member or members 37 are moved in the direction of the arrow 39 indicated in FIG. 8. At this time, the engagement pawl 37e (FIG. 11) slides along the engagement edge 40d of the release member 40, causing this release member 40 to be rotated as shown in FIG. 11. The push attachment 40c of the release member 40 pushes the engagement member 43 in the direction of the arrow 44 indicated in FIGS. 11 and 12 against the force of the spring 60 (FIG. 12), causing the engagement pawl 58 of the engagement member 43 to be released from the engagement projection 52 (FIG. 12). As a result, the large gear 47 is slightly rotated by the push attachment 61d of the leaf switch 61 in the direction of the arrow 62 (FIG. 13). At this time, the notch 48 of the large gear 47 is moved in the same direction, effecting engagement between the large gear 47 and pinion 46. As a result, the movable contact 61c of the leaf switch 61 touches the second fixed contact 61b. Now the reel shaftdriving motor 68 is started to rotate the capstan shaft 45 and reel shaft (not shown). When the capstan shaft 45 is rotated by engagement between the large gear 47 and pinion 46, then the large gear 47 is rotated counterclockwise in the direction of the arrow 62 (FIG. 14). The cam 50 mounted on the large gear 47 pushes the cam roller 63, thereby causing the cam lever 55 to be rotated counterclockwise in the direction of an arrow 66 indicated in FIG. 14 against the force of the spring 65 to occupy a position shown therein. The actuation of the cam lever 55 is conveyed to the transmission member 36, which in turn is rotated counterclockwise in the direction of an arrow 67 indicated in FIG. 15. At this time, the push member 36b of the transmission member 36 depresses the abutting attachment 37d of the insertable actuating member 37, causing said insertable actuating member 37 and operation member 33 to be jointly rotated in the direction of an arrow 68 indicated in FIG. 15. When the operation member 33 is locked in an actuated state by the engagement board 35 and then rotated to actuate a prescribed mechanism mounted on the substrate of the cassette tape recorder, then said cassette tape recorder commences its operation for the mode of play, record, fast forward or rewind. The power supply switch 67 is closed when a push button is depressed, and remains closed while the operation member 33 is locked in an actuated state by the engagement board 35. During this interim, the motor 68 does not cease to be driven, even if the movable contact 61c of the leaf switch 61 is connected to the first fixed contact 61a. Even when the transmission member 36 is rotated in the direction of the arrow 67 (FIG. 15), the abutting member 37d of the insertable actuating member 37 which is not brought down is not pushed by the push member 36b. Therefore, only the depressed insertable actuating member 37 and the corresponding operation member 33 are rotated by the transmission member 36.

Figure 15:
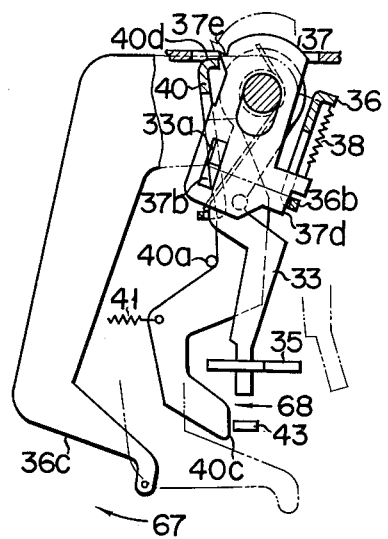

The engagement member 43 is rotated by the push attachment 40c of the release member 40 and removed from the inner peripheral wall of the annular protuberance 51 (FIG. 9). When, however, the large gear 47 is rotated in the direction of the arrow 62, and the engagement projection 52 passes by the engagement pawl 58 as shown in FIG. 13, then the engagement member 43 is released from the push force of the push attachment 40c as shown in FIG. 15 and is brought back to the position shown in FIG. 14 by the action of the spring 60. As a result, the engagement pawl 58 of the engagement member 43 is again pressed against the inner peripheral wall of the annular protuberance 51. Where, therefore, the large gear 47 makes one full rotation to cause the notch 48 to face the pinion 46, then the engagement pawl 58 is engaged with the engagement projection 52, and the large gear 47 is again disengaged from the pinion 46. At this time, the push attachment 61d of the leaf switch 61 again elastically abuts against the start projection 53 (FIG. 9). When, therefore, disengaged from the engagement member 43, the large gear 47 can be rotated to a point engageable with the pinion 46.

Figure 16:
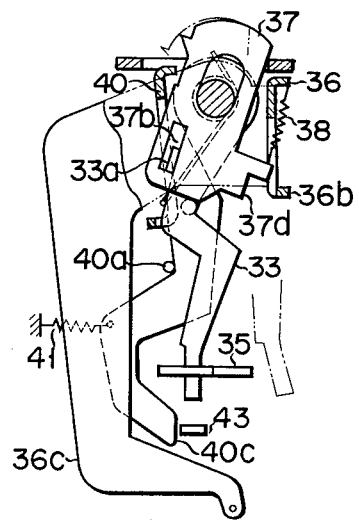

When the large gear makes one full rotation, the cam roller 63 immediately falls from the largest radius part of the vortical cam 50 to the smallest radius part thereof. As a result, the cam lever 55 is returned from the position of FIG. 14 to the original position of FIG. 9. At this time, both transmission member 36 and cam lever 55 regain the original position. However, the operation member 33 remains locked in an actuated state by the engagement board. When the insertable actuating member 37 which has been brought down by the release member 40 is rotated with the operation member 33, then the engagement pawl 37e of said insertable actuating member 37 is disengaged from the engagement edge 40d of the release member 40. At this time, the insertable actuating member 37 is rotated or inclined through the same angle as that through which the operation member 33 is rotated and is lifted back to the original position (FIG. 16) by the action of the spring 38. FIG. 16 shows the condition in which a selected operation member 33 is locked by the engagement board 35 in a state actuated for the mode of play, record, fast forward or rewind. To release the cassette tape recorder from the abovementioned operation, the stop push button has only to be depressed. When the stop push button is depressed under the condition of FIG. 16, an insertable actuating member 37 corresponding to said stop push button falls to actuate an operation member 33 for the stop mode. As a result, another operation member 33 already locked in an actuated state by the engagement board 35 is unlocked. Thereafter, the operation member 33 itself for the stop mode, is returned to the original position without being locked by the engagement board 35.

Where, for example, the play mode is changed over to another mode, for example, the rewind mode, it is advised to depress a push button corresponding to the rewind mode. Where a different insertable actuating member 33 from that indicated in FIG. 16 is brought down in the condition of FIG. 16, then said another mode, for example, the rewind mode is carried out. In this case, an operation member 33 corresponding to the subsequently depressed push button is locked in an actuated state by the engagement board 35 in place of the operation member 33 corresponding to the preceding operation mode, for example, the play mode, thereby performing the desired rewind mode.

Where, during a selected operation mode, the same push button as that which was depressed for said selected mode is depressed by mistake, the insertable actuating member 37 corresponding to the operation member 33 for said selected operation mode is already rotated with the operation member 33. Therefore, the engagement pawl 37e of said insertable actuating member 37 is not engaged with the engagement edge 40d of the release member 40, preventing the release member 40 from being rotated. Therefore, even the erroneous depression of the same push button does not give rise to the actuation of any unnecessary mechanical member.

The mode of record, temporary fast forward (referred to as "cue") or temporary rewind (referred to as "review") is generally undertaken by depressing two push buttons. With the manual operation device of this invention, the depression of two push buttons causes the corresponding two operation members to be locked by the engagement board 35 in a state locked for a desired operation mode.

With the manual operation device of this invention arranged as described above, a force of actuating the operation member 33 is chiefly supplied from the pinion 46 or capstan shaft 45 acting as a drive rotatable member. The manual operation can be carried out simply by pushing the insertable actuating member 37 between the operation member 33 and transmission member 36, and consequently requires a far smaller operation force than in the conventional manual operation device in which the operation members are directly actuated by the hand. The pinion 46 acting as a drive rotatable member is fixed to the capstan shaft 45, making it unnecessary to provide any exclusive source of drive power for the present manual operation device. Therefore, this invention can provide a manual operation device whose arrangement is simplified and which can be manufactured at low cost. Further according to the invention, a selected insertable actuating member 37 is depressed between the transmission member 36 and operation member 33 to effect their joint movement. Therefore, only the operation member 33 corresponding to a selectively manually depressed insertable actuating member 37 is moved with the transmission member 36. Thus a single transmission member 36 can be used in common to all operation members 33. The common use of said single transmission member 36 does not result in the erroneous actuation of any mechanical member. Further, the insertable actuating member 37 is locked in a fallen state by the release member 40, and unlocked by the rotation of the operation member 33. Even when, therefore, a push button is not continuously depressed until the operation member 33 begins to be actuated, the difficulty does not arise that the insertable actuating member 37 is returned to its original position during the interim period. Once depressed and later rotated clockwise, the insertable actuating member 37 is kept in said rotated state, until the corresponding operation member 33 regains its original position. When, therefore, the depressed insertable actuating member 37 is detected, the current operation mode can be displayed by mechanical or electric means. The manual operation device of this invention allows for the direct use of the operation members and engagement members provided for the conventional cassette tape recorder, and is consequently applicable to the prior art tape recorder with relative ease without any noticeable design change.

What is claimed is:

1. A manual operation device which comprises:
  a plurality of operation members;
  a drive rotatable member acting as a source of drive power;
  a driven rotatable member detachably fitted to the drive rotatable member;
  an engagement member for engaging and locking the driven rotatable member in a state disengaged from the drive rotatable member;
  a transmission member movable back and forth with the driven rotatable member; and
  a plurality of self-returning insertable actuating members which are associated with respective ones of said operation members, and constructed to be manually moved between the transmission member and the associated operation members to disengage the engagement member from the driven rotatable member and also transmit a moment of the transmission member to the operation member.

2. The manual operation device according to claim 1, wherein all the insertable actuating members are detachably fitted to the transmission member to be rotated therewith.

3. The manual operation device according to claim 1, wherein the selected one of the plural insertable actuating members is brought down between the transmission member and the operation member corresponding to said selected insertable actuating member to previously rotate the transmission member slightly in a direction opposite to that in which the transmission member is subsequently rotated for actuation; and the previous rotation of the transmission member in said opposite direction disengages the engagement member from the driven rotatable member.

4. The manual operation device according to claim 1, wherein all the insertable actuating members are detachably fitted to the operation members; and a selected one of the insertable actuating members is rotated with the corresponding operation member.

5. The manual operation device according to claim 1, wherein the selected insertable actuating member is locked between the common transmission member and the corresponding operation member and unlocked when said selected insertable actuating member is rotated.

* * * * *